July 9, 1946.  J. A. RANKIN  2,403,755
REGENERATIVE INDICATING SYSTEM
Filed Aug. 22, 1941
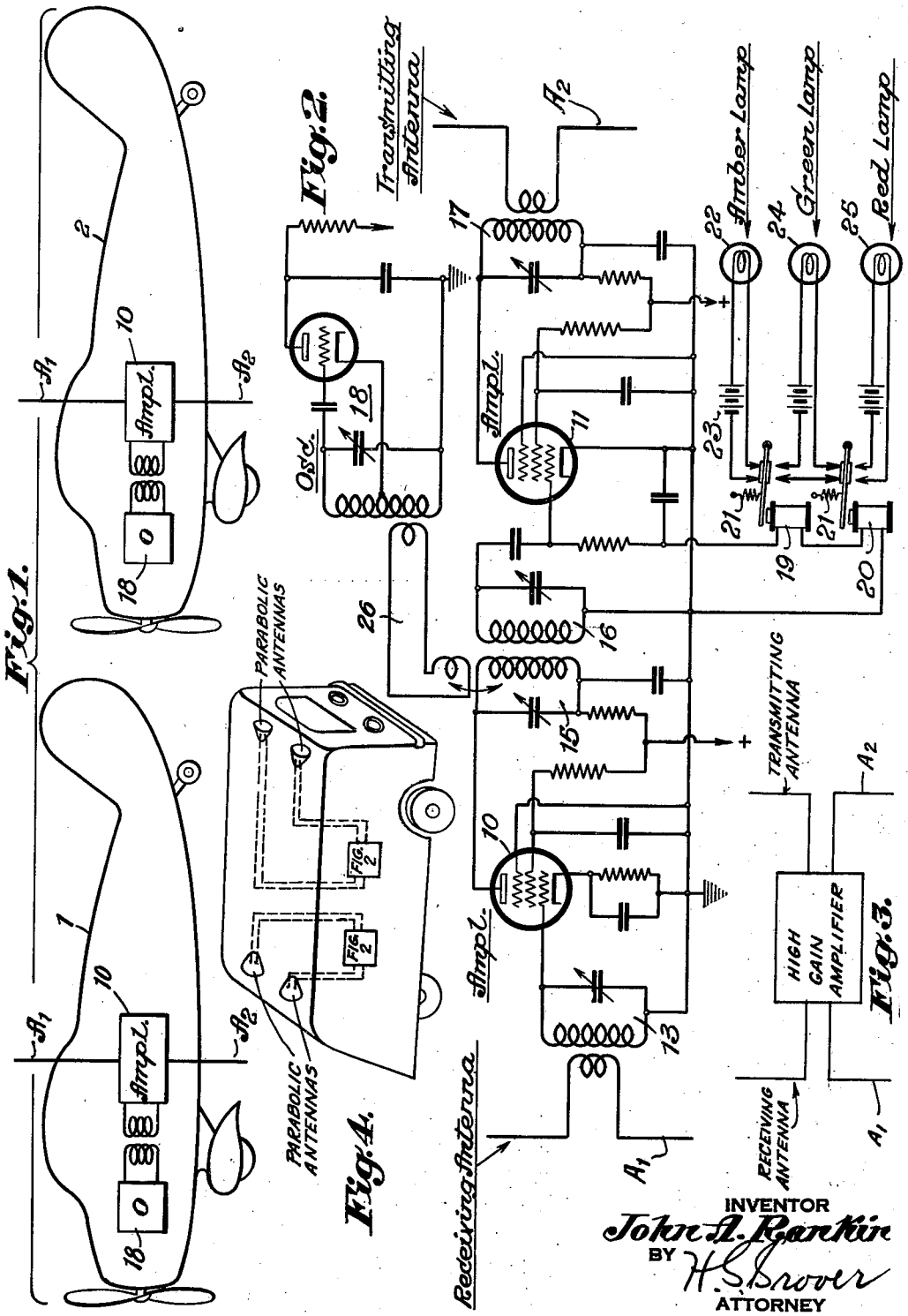

Patented July 9, 1946

2,403,755

UNITED STATES PATENT OFFICE 2,403,755

REGENERATIVE INDICATING SYSTEM

John A. Rankin, Port Washington, N. Y., assignor to Radio Corporation of America, a corporation of Delaware Application August 22, 1941, Serial No. 407,966

11 Claims. (Cl. 250—2)

This invention relates to a radiant energy regenerative feed back system for use between two or more movable vehicles, such as airplanes, tanks, trucks, ships, or combinations of such craft.

It is desirable in wartime that two or more friendly airplanes be able to identify themselves to one another during flight with a system having a limited range of transmission, such that more remotely located enemy stations may not be apprized of the presence of the planes. The present invention provides a system by means of which two or more friendly airplanes, equipped with identical apparatus, can provide a characteristic indication when flying within the effective range of transmission. By means of this invention, the pilot of a combat plane is immediately able to determine whether an approaching craft is a friend or a foe.

The present invention finds further use in connection with truck convoys, where it is essential during war conditions that trucks be able to follow one another in the dark without losing contact or colliding with each other. By means of the present invention there is provided a system for determining not only whether one truck is immediately behind another truck in the convoy, but also the approximate distance between adjacent trucks.

A more detailed description of the invention follows in conjunction with a drawing, wherein:

Fig. 1 illustrates diagrammatically the application of the invention to a pair of airplanes;

Figs. 2 and 3 show in detail one embodiment of the circuit which can be used on each plane, both for identification purposes and for determining the relative distance between planes; and Fig. 4 illustrates diagrammatically the application of the invention to an automobile truck.

Referring to Fig. 1 in more detail, there is shown a pair of airplanes (for example, combat planes) 1 and 2, each of which is provided with suitable radiating apparatus comprising an oscillator 18, an amplifier 10, a transmitting antenna $A_1$, and a receiving antenna $A_2$. The antennas $A_1$ and $A_2$ are arranged in a manner to reduce the coupling between them substantially to zero. The reason for this is to prevent such feed back between the transmitting and receiving antennas of each plane which will produce regeneration. One way by which this may be accomplished is to position the antennas $A_1$ and $A_2$ in a vertical line with the metallic body of the plane located between them. These antennas may be of any suitable form, although it is preferred, in the arrangement shown in the drawing, that each antenna be one-quarter wavelength long at the operating frequency. Obviously, if the body of the plane is made of metal, the antenna should be suitably insulated from the plane at their points of support; if the body of the plane is made of plastic material or other suitable insulation, the antennas can be positioned in known manner to minimize coupling between them. The oscillator 18 in each plane is preferably a constant frequency type, such as a crystal oscillator, supplying energy to be amplified by apparatus 4 and radiated from the transmitting antenna $A_1$. The system is so designed that the waves radiated by each transmitting antenna is relatively weak in intensity and may be effective within a very limited range. For airplanes, such a range might be, perhaps, 7500 yards, in order to enable the pilot to determine within a short time before an approaching craft comes within effective firing range whether the approaching craft is a friend or a foe.

With the system as thus so far described, if the airplane 2 is a friend and is equipped identically as airplane 1, the radiated wave from the transmitting antenna $A_1$ of plane 1 will be received on the receiving antenna $A_2$ of plane 2, amplified in apparatus 10 in plane 2, and the amplified waves transmitted over transmitting antenna $A_1$ of plane 2 and received on receiving antenna $A_2$ of plane 1, thus providing a regenerative feed back circuit between the two planes. As the planes approach each other, the overall radiation coupling in this feed back circuit will increase, thereby increasing the amplitude of the radiated waves to an extent necessary to provide a suitable indication to the pilot. Obviously, the apparatus in both planes are not only identical but should operate at the same frequency.

If the pilot of a plane equipped with the invention finds that the approaching craft is within the range in which his radio equipment should increase in intensity of output, but does not do so, the pilot will immediately realize that the approaching craft is a foe and will take suitable steps to engage him in combat or avoid him, if necessary. Looking at it another way, we can say that the apparatus in the two planes 1 and 2, taken together, constitute a single oscillator circuit, when located within a distance to provide suitable regenerative feed back between the two planes. The distance at which self-oscillations take place may be controlled by changing the gain of the amplifiers 10; that is, as the gain is increased in both amplifiers 10, the distance between the planes may likewise be increased and still provide the desired regenerative feed back.

Each of the planes 1 and 2 is preferably provided with a suitable indicating device, such as a lamp or an alarm to indicate when self-oscillation or increased intensity of output takes place, which will occur only when another craft, identically equipped, is within the range to provide regenerative feed back.

Fig. 2 shows, by way of example only, one circuit arrangement for the radio apparatus of planes 1 and 2. In Fig. 2 there is shown an amplifying circuit comprising a pair of vacuum tubes 10 and 11 arranged in cascade and positioned between a receiving antenna $A_2$ and a transmitting antenna $A_1$. The receiving antenna $A_2$ is shown coupled to a tuned input circuit 13 connected between the grid and cathode of the first vacuum tube amplifier 10. This vacuum tube is shown as being of the multi-grid type, although, if desired, a triode or a four-element tube can be used instead. The anode of the vacuum tube 10 is connected to a parallel tuned output circuit 15 to which is coupled another parallel tuned circuit 16 constituting the input circuit for the multi-grid vacuum tube 11. The anode of vacuum tube 11 is connected to another parallel tuned circuit 17 which is the output for amplifier 11 and which is coupled to the transmitting antenna $A_1$. A local oscillator 18 of the Hartley type is shown coupled to the tuned circuit 15 by means of coupling circuit 26 by virtue of which the oscillations generated by this oscillator are amplified in 11 and radiated from antenna $A_1$ in a relatively weak transmission. The parallel tuned circuits 13, 15, 16 and 17 are tuned to the same frequency of operation, which is also the same frequency of operation as antennas $A_1$ and $A_2$. These antennas are shown as dipoles having an overall length of preferably a half wavelength at the operating frequency and so arranged with respect to one another that there is substantially no coupling between them. To reduce the feed back between antennas $A_1$ and $A_2$ to a minimum, one may use the usual known expedients of providing a shield between the antennas, which shield may take the form of the metallic body of a plane as hereinabove described in connection with Fig. 1. The advantage of coupling the oscillator 18 to the tuned circuit 15 is that the output of the oscillator is amplified by vacuum tube 11 only and radiated over $A_1$ and cannot react back upon the receiving antenna $A_2$ through the vacuum tube 10. By way of example, the amplifying stage 10 might be arranged to give a gain of 100 while the second vacuum tube stage 11 might be arranged to give a gain of ten, thus providing an overall gain of 1000 between antennas $A_2$ and $A_1$.

In order to provide a suitable indication to the pilot of a plane, there are provided a pair of relays 19 and 20 arranged electrically in series relation and connected between the grid and cathode of the vacuum tube 11. Normally, when there is no regenerative feed back path provided by another vehicle equipped identically with the apparatus of Fig. 2, the armatures of the relays 19 and 20 will be in the positions indicated in the drawing and maintained this way by means of springs 21, 21. In this position, the amber lamp 22 will be lighted over a path traced from the positive terminal of battery 23 through the filament of lamp 22, through the upper two contacts on the armature of relay 19 as closed by the armature, and back to the negative terminal of the battery 23. When, however, a regenerative feed back path is provided by virtue of the approach of another vehicle having the same equipment as Fig. 2, the current through the relay 19 will increase to such an extent that its armature will be attracted to the core of the relay against the tension of the spring 21 so as to break the circuit through the amber lamp 22 and complete a path through the lower contacts of the armature of relay 19 in order to light the green lamp 24. It should be noted at this time that the path to light the green lamp 24 not only includes the contacts associated with the armature of relay 19 but also includes the upper contacts associated with the relay 20. The green lamp 24 will thus light so long as the regenerative feed back path is such that the intensity of output does not exceed a predetermined value to operate the relay 20. When, however, the intensity of output increases to an extent which will operate the relay 20, which will occur when the two planes have approached quite close to one another, the armature of relay 20 will break the circut for the green lamp 24 and will complete a circuit to light the red lamp 25 over an obvious path.

As an example of the range of distance within which the relays 19 and 20 will function, the apparatus may be designed and suitably biased by adjusting the gain of the vacuum tubes, such that a regenerative feed back path sufficient to operate the relay 19 but not to operate the relay 20 must take place within a range of between 7500 and 5000 yards. If the planes approach closer than 5000 yards, then the relay 20 can be made to operate to light the red lamp. It should be distinctly understood, of coorse, that these distances are given by way of example only, and that they may be considerably shortened or lengthened to suit various conditions encountered in practice. As an example, if the principles of the present invention are employed on trucks in a convoy, naturally the distance mentioned above would be considerably shortened, to be effective, let us say perhaps within a range of 150 to 75 feet.

Although the apparatus of Figs. 1 and 2 have been described with particular reference to the use of a local oscillator, this local oscillator may, under some circumstances, be eliminated provided that the gain of the amplifiers is sufficiently high to provide the desired regenerative feed back path between two similarly equipped vehicles within a desired range of distances. Fig. 3 shows very schematically a circuit arrangement of the invention which requires no local oscillator. The amplifier system illustrated in box form may, if desired, be similar to the amplifier system illustrated in Fig. 2.

The invention has the following advantages: (1) It provides an identification system between two or more moving vehicles within a desired limited range of transmission; (2) it provides a means for determining approximate distances between vehicles; (3) the apparatus is extremely simple and inexpensive to construct; and (4) with properly designed apparatus the normal radiation will be weak or non-existent, thereby lessening or completely eliminating the possibility of detection by the enemy. In connection with this last advantage, it will be evident that where desired more than two vacuum tubes and associated circuits can be employed to provide higher gain. If it is desired, from a standpoint of secrecy, to change the operating frequency, either the entire apparatus or the operating frequency of the apparatus can be very simply changed because of the inherent simplicity of the system.

The present invention not only finds a field of use in connection with combat planes, but also has application to motor vehicles for use in truck convoys. A difficulty hitherto experienced in the use of truck convoys is that certain trucks in a convoy may lose their way in the dark. By equipping each truck with equipment such as shown in Fig. 2, both for the front and the back of the truck, and by locating each of the antennas in a suitable parabolic reflector, it will be evident that the rear equipment of each truck will cooperate with the front equipment of the following truck to provide the desired regenerative feed back circuit, and by adjustment of the gain in the amplifiers, the lamp indicators will serve to acquaint the driver of the truck of the approximate distance between himself and the preceding vehicle. Fig. 4 illustrates, by way of example, schematically, how a truck can be equipped with the apparatus of Figs. 2 and 3. The invention also finds use in connection with planes flying in formation. The planes can thus maintain desired distances between one another.

It is to be understood that the term "vehicle" used in the appended claims includes any movable object which will transport the apparatus of the invention, such as an automobile, plane, ship, person or animal.

What is claimed is:

1. A radiant energy system for use between a pair of stations at least one of which is a vehicle, said stations having amplifiers operating at the same frequency, and input and output antennas for each amplifier arranged to minimize coupling therebetween, whereby the amplifiers of said stations together, within a predetermined distance of each other, constitute a regenerative circuit by virtue of the space radiation between the output antenna of each amplifier and the input antenna of the other amplifier.

2. A radiant energy system for use between a pair of vehicles having amplifiers operating at the same frequency, and input and output antennas for each amplifier arranged to minimize coupling therebetween, whereby the amplifiers of said vehicles together, within a predetermined distance of each other, constitute a regenerative circuit by virtue of the space radiation between the output antenna of each amplifier and the input antenna of the other amplifier, and an indicator coupled to each amplifier for indicating when said vehicles are within said predetermined distance.

3. A radiant energy system for use between a pair of vehicles having amplifiers operating at the same frequency, input and output antennas for each amplifier arranged to minimize coupling therebetween, and a local oscillator associated with each amplifier to cause a relatively weak radiation from the associated output antenna, whereby said amplifiers together, within a predetermined distance of each other, constitute a regenerative circuit by virtue of the space radiation between the output antenna of each amplifier and the input antenna of the other amplifier.

4. A radiant energy system in accordance with claim 1, characterized in this that said vehicles are airplanes, the input and output antennas for each amplifier being mounted vertically on the upper and lower portions of the airplane body.

5. A radiant energy system in accordance with claim 1, characterized in this that said vehicles are automobiles, the input and output antennas of one vehicle being mounted in the rear of the automobile and shielded from one another, while the input and output antennas of the other vehicle are mounted in the front of the automobile and shielded from one another.

6. A radiant energy system for use between a pair of vehicles having amplifiers operating at the same frequency, and input and output antennas for each amplifier arranged to minimize coupling therebetween, whereby said amplifiers together, within a predetermined distance of each other, constitute a regenerative circuit by virtue of the space radiation between the output antenna of each amplifier and the input antenna of the other amplifier, an indicator coupled to each amplifier for indicating when said vehicles are within said predetermined distance, and another indicator coupled to each amplifier for indicating when said vehicles are spaced from one another by a certain distance within said predetermined distance.

7. A radiant energy system for use between a pair of vehicles having amplifiers operating at the same frequency, each amplifier comprising a pair of vacuum tubes in cascade and having an input antenna coupled to one vacuum tube and an output antenna coupled to the other vacuum tube, an oscillator coupled to a point between the two vacuum tubes of each amplifier to cause a relatively weak radiation from the output antenna, the antennas of each amplifier being arranged to minimize coupling therebetween, whereby said amplifiers together, within a predetermined distance of each other, constitute a regenerative circuit by virtue of the space radiation between the output antenna of each amplifier and the input antenna of the other amplifier, and means for detecting the increase in amplitude of output of each amplifier caused by said regenerative circuit.

8. A radiant energy indicating system for use between a pair of spaced vehicles having similar vacuum tube equipment, the equipment of each vehicle comprising a multistage amplifier system having an input antenna coupled to the input of one stage and an output antenna coupled to the output of another stage, said amplifier systems of said pair of vehicles constituting a regenerative feed back circuit within a predetermined range by virtue of the space radiation between the output antenna of each multistage amplifier and the input antenna of the other multistage system, relays operatively coupled to each multistage amplifier system and operative in response to different degrees of intensity of regeneration, and a visual indicator associated with each relay, whereby said indicators serve to indicate ranges of distance between said vehicles.

9. A radiant energy indicating system for use between a pair of spaced vehicles having similar vacuum tube equipment, the equipment of each vehicle comprising a multistage amplifier system having an input antenna coupled to the input of one stage and an output antenna coupled to the output of another stage, an oscillator for each multistage amplifier system coupled to said system at a point between said stages, said amplifier systems of said pair of vehicles constituting a regenerative feed back circuit within a predetermined range by virtue of the space radiation between the output antenna of each multistage amplifier and the input antenna of the other multistage system, relays operatively coupled to each multistage amplifier system and operative in response to different degrees of intensity of regeneration, and a visual indicator associated with each relay, whereby said indicators serve to indicate ranges of distance between said vehicles.

10. A radiant energy indicating system for use between a pair of spaced vehicles having similar vacuum tube equipment, the equipment of each vehicle comprising a multistage amplifier system having an input antenna coupled to the input of one stage and an output antenna coupled to the output of another stage, said first stage providing an appreciably smaller gain than said last stage, said amplifier systems of said pair of vehicles constituting a regenerative feed back circuit within a predetermined range by virtue of the space radiation between the output antenna of each multistage amplifier and the input antenna of the other multistage system, relays operatively coupled to each multistage amplifier system and operative in response to different degrees of intensity of regeneration, and a visual indicator associated with each relay, whereby said indicators serve to indicate ranges of distance between said vehicles.

11. A radiant energy system for use between a pair of vehicles having amplifiers operating at the same frequency, and an input electromagnetic energy collecting device and an output electromagnetic radiating device for each amplifier arranged to minimize coupling therebetween, whereby the amplifiers of said vehicles together, within a predetermined distance of each other, constitute a regenerative circuit by virtue of the space radiation between the output electromagnetic energy radiating device of each amplifier and the input electromagnetic energy collecting device of the other amplifier.

JOHN A. RANKIN.